United States Patent [19]
de Kock

[11] Patent Number: 5,467,852
[45] Date of Patent: Nov. 21, 1995

[54] TWIN-PIPE SHOCK ABSORBER

[75] Inventor: Cornelis de Kock, Oud-Beijerland, Netherlands

[73] Assignee: Koni, B.V., Netherlands

[21] Appl. No.: 396,312

[22] Filed: Feb. 28, 1995

Related U.S. Application Data

[63] Continuation of Ser. No. 113,888, Aug. 30, 1993, Pat. No. 5,423,402, which is a continuation of Ser. No. 474,847, filed as PCT/NL89/00016, Mar. 4, 1989, abandoned.

[30] Foreign Application Priority Data

Apr. 6, 1988 [NL] Netherlands .............. 8800882

[51] Int. Cl.$^6$ .................... F16F 9/34; F16F 9/44
[52] U.S. Cl. .............. 188/322.14; 188/280; 188/299; 188/315; 188/322.15
[58] Field of Search ................. 188/315, 279, 188/280, 282, 299, 285, 312, 316, 317, 322.13, 322.14, 322.15, 322.22

[56] References Cited

U.S. PATENT DOCUMENTS

| | | | |
|---|---|---|---|
| 1,920,228 | 8/1933 | Wood | 51/95 |
| 2,055,365 | 9/1936 | Rossman | 188/88 |
| 2,512,269 | 6/1950 | Ezbelent | 188/88 |
| 3,414,092 | 12/1968 | Speckhart | 188/100 |
| 3,763,970 | 10/1973 | Anderson | 188/282 |
| 4,838,394 | 6/1989 | Lemme et al. | 188/299 |

FOREIGN PATENT DOCUMENTS

| | | |
|---|---|---|
| 951843 | 11/1949 | France . |
| 2552515 | 3/1985 | France . |
| 2560325 | 8/1985 | France . |
| 1455903 | 6/1969 | Germany . |
| 3423698A1 | 1/1985 | Germany . |
| 6805485 | 10/1969 | Netherlands . |
| 2154700 | 9/1985 | United Kingdom . |
| 2159604 | 12/1985 | United Kingdom . |
| WO8504698 | 10/1985 | WIPO . |
| WO8707565 | 12/1987 | WIPO . |

OTHER PUBLICATIONS (JP58221033A) Komamura, Frequency–Sensitive Shock Absorber, Jun. 16, 1982, Abstract.
(JP60113832A) Naruse, Mounting Device of Power Unit, Nov. 21, 1983, Abstract.

*Primary Examiner*—Robert J. Oberleitner
*Assistant Examiner*—Peter M. Poon
*Attorney, Agent, or Firm*—Dykema Gossett

[57] ABSTRACT

A twin-pipe shock absorber comprises a working cylinder (1), a piston (4) which is movable in the cylinder and has a passage and upstream valve (13, 14, 15), and external pipe (2) which is fitted around the working cylinder having an oil tank (3) formed therebetween, a disc (7) having a passage (16) and an upstream valve (17) positioned near the passage to shut off the working cylinder, a central pipe (10) extending through the piston (4) having its bottom end projecting through the disc (7) so as to produce a shock absorber in which the shock absorption can be adapted very rapidly to the frequency of movement of the unsprung wheel guide part, the damper valve being disposed at the bottom end of the central pipe (10), and a regulation device to regulate the damping exerted by the damper valve depending at least on the frequency which the working cylinder vibrates.

7 Claims, 2 Drawing Sheets

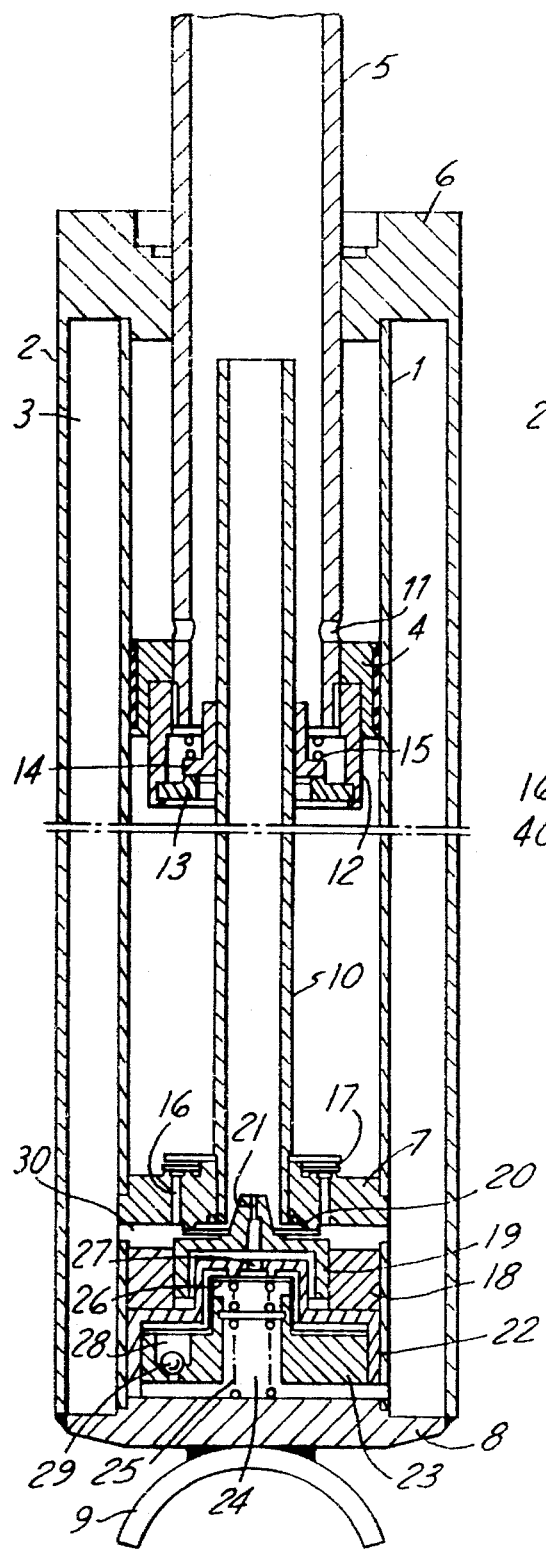
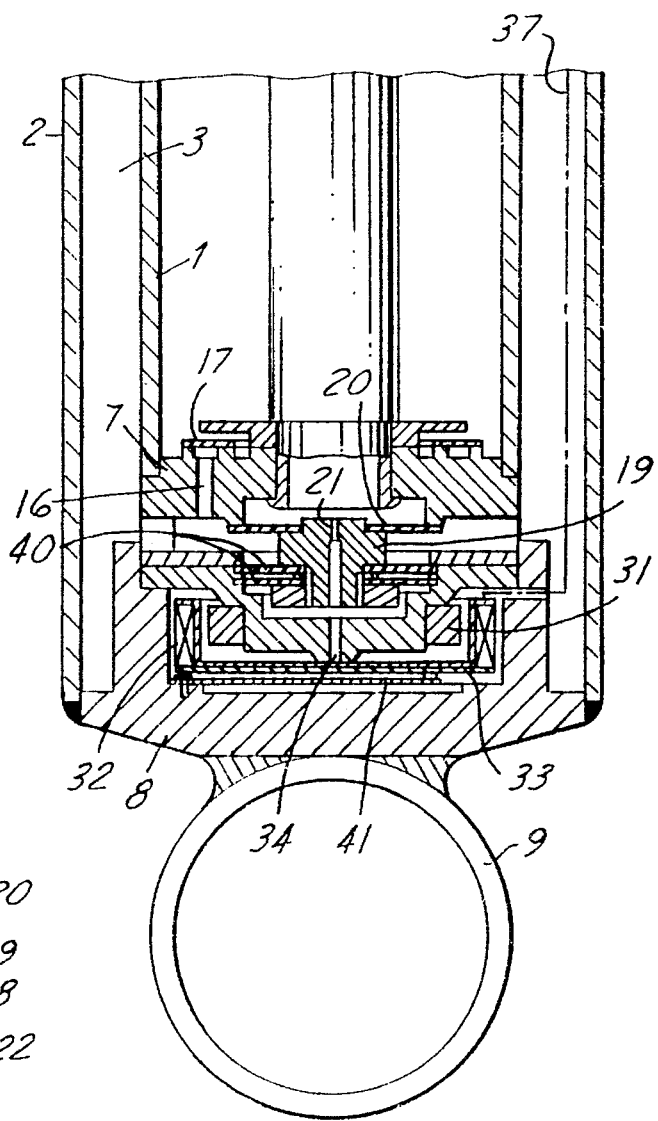
FIG. 1
FIG. 4

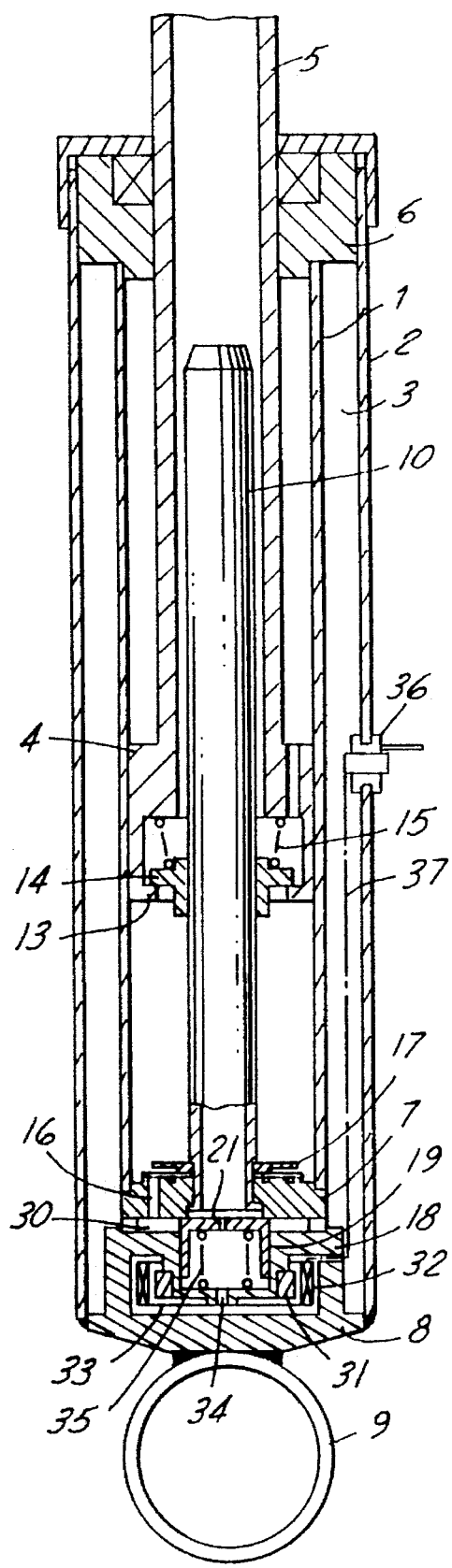
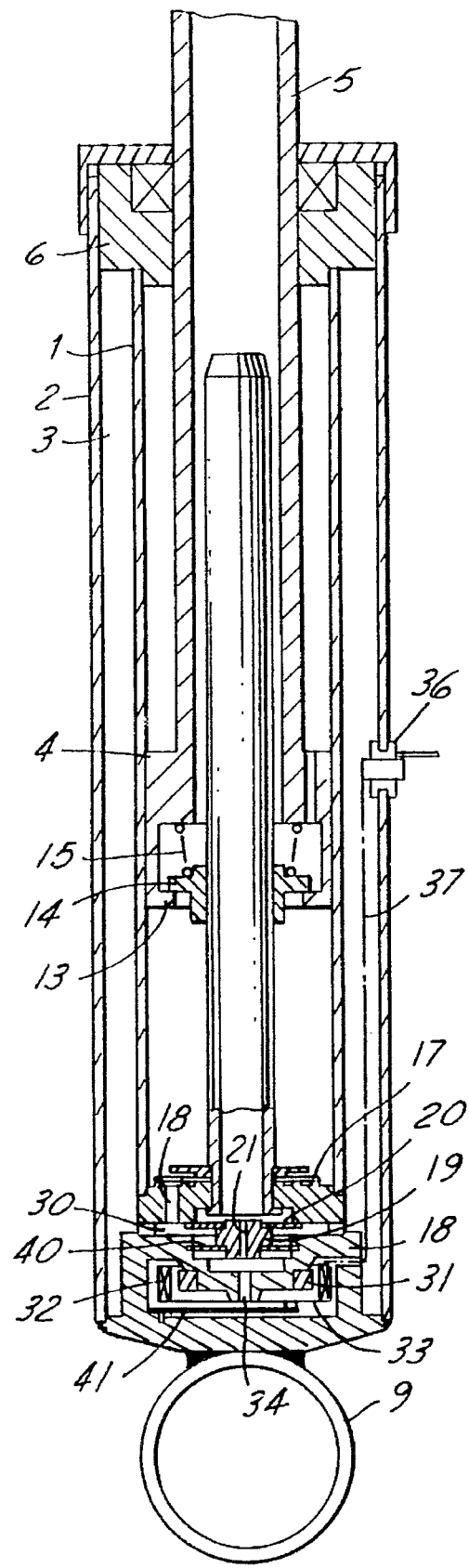

TWIN-PIPE SHOCK ABSORBER

This application is a continuation of application Ser. No. 08/113,888, filed on Aug. 30, 1993 now U.S. Pat. No. 5,423,402, which is a continuation of application Ser. No. 07/474,847, filed on Sep. 25, 1990, now abandoned, which is based on PCT application Ser. No. PCT/NL89/00016, filed Apr. 3, 1989, claiming priority to patent application Ser. No. NL 8800882 filed on Apr. 6, 1988.

The invention relates to a twin-pipe shock absorber comprising an oil reservoir between a working cylinder and an external pipe, a piston movable in a working cylinder, a hollow piston rod extending to the upper side of the working cylinder, a bottom plate closing the working cylinder, a disc inside the working cylinder between the piston and the bottom plate said disc having a passageway and a non-return valve for control of upflow through said passageway, a central pipe extending through the piston into the hollow piston rod and the space above the piston, a damper valve assembly and regulating means to regulate the flow resistance excerted by the damper valve assembly depending at least on the relative movement of the piston and the working cylinder.

The main advantage of such a shock absorber is that the shock absorption can be adapted very rapidly to the frequency of movement of the unsprung wheel guide part which results in a considerable improvement of the driving comfort.

A twin-pipe shock absorber as mentioned in the preamble is disclosed in U.S. Pat. No. 4,682,675. The damper valve assembly of this known construction is a part of the piston and comprises a set of passageways occluded at one end by a first spring loaded flapper and a set of passageways occluded at one end by a second spring loaded flapper valve. The compression and rebound rates of the shock absorber are determined by the diameters of the passageways and the spring load on the flapper valves. The regulating means comprises a solenoid valve which is activated in case of a severe bump. By the activation of the solenoid valve the pressure differential across the piston is increased. As a result the stiffness of the shock absorber in compression is reduced. During the rebound or when the wheel falls into a hole the fluid pressure in the upper working chamber above the piston is increased and when the solenoid valve is actuated the upper working chamber is vented to the reservoir. This known construction is based on the idea to make the damper partially ineffective by influencing the pressure differential across the piston by a parallel leak. The main disadvantage thereof is that the damping characteristics are highly dependent on the velocity of the piston. An other disadvantage of the shock absorber disclosed in U.S. Pat. No. 4,682,675 is that the damper valve assembly comprises at least two valves each for one flow direction.

The object of the invention is to eliminate these disadvantages and to provide a shock absorber of the type mentioned in the preamble, in which the shock absorption is substantially independent of the piston velocity and of which the flow through the damper is in one direction only.

According to the invention the above twin-pipe shock absorber is characterized in that the piston has a passageway and a non-return valve for control of upflow through said passageway with a negligible damping capacity, that the damper valve assembly is a single uni-directional damper valve which is disposed at the bottom end of the central pipe, that the valve body of the damper valve is disposed on or forms part of an amplifier element, that the seat of the damper valve is on the lower side of the disc, that said amplifier element is displaceable up and down and has a narrow oil passageway, and that the regulating means are able to regulate the oil pressure below the amplifier element.

It is of essential importance that the oil flow on the ingoing and outgoing stroke of the piston is conveyed through the central pipe to one single damper valve, and that damping of this valve can be set rapidly. The piston of the shock absorber and the guide of the piston are simple in design: there is only one non-return valve which can be placed around the central pipe in such a way that it seals dynamically.

In order to produce the regulation by mechanical means, provision is made below the amplifier element for a mass inertia piston between two springs or spring systems, in which piston there is a passage which is provided with an non-return valve and connects the space above and below the piston, there being above the piston an oil passage with valve which can be opened when the oil pressure is raised above the piston, in order to reduce the pressure below the amplifier element.

A finer regulation is, however, possible if provision is made below the amplifier element for a throttle plate fixed to one or more coils which are placed in the field of at least one permanent magnet, it being possible to move the throttle plate up and down through more or less amplifier of the coils, and provision being made between the throttle plate and the amplifier element for an oil chamber having an oil throughflow spout which can be shut off to a greater or lesser extent by the throttle plate.

The amplifier element can be a piston which is displaceable in a cylinder. The leakage occurring between cylinder and amplifier piston can cause problems in accuracy. It may therefore be preferable for the amplifier element to be suspended in resilient membranes.

If a spring acts upon the throttle plate, fitting tolerances can be eliminated.

The invention also relates to a vehicle provided with a shock absorber of the above-mentioned type, in which a throttle plate fixed to one or more coils is disposed below the amplifier element. According to the invention, the coils have an electrical connection to a regulation system which is in turn connected to sensors for measuring different movements of the vehicle, and which can give signals to the coils depending on the movements measured.

The invention will now be explained in greater detail with reference to the figures, in which a number of embodiments are shown in longitudinal section.

FIGS. 1, 2 and 3 show respectively three embodiments of shock absorbers according to the invention.

FIG. 4 shows the bottom end of the embodiment according to FIG. 3, on a larger scale.

The shock absorber shown in FIG. 1 comprises a working cylinder 1 designed as an internal pipe, an external pipe 2, a tank 3 located between the working cylinder 1, a piston 4 which is displaceable in the working cylinder, a hollow piston rod 5 connected to the sprung part of a wheel suspension part, a cover 6 shutting off the working cylinder and the tank at the top and also forming guidance for the piston rod, a disc 7 shutting off the working cylinder 1 a short distance above its bottom end, and a bottom plate 8 which shuts off the working cylinder 1 and the external pipe 2 and is provided with a fastening eye 9 for fastening the shock absorber to the unsprung part of the wheel guide.

A central pipe 10, projecting with its bottom end through the disc 7, extends through the piston 4.

Just above the piston 4, the piston rod 5 has apertures 11 which connect the space above the piston to the interior of the piston rod. The top end of the central pipe 10 is some distance above the apertures 11. The piston 4 is provided with a cylindrical valve housing 12, a valve seat 13, a valve body 14 which is pressed by a spring 15 on the seat 13. The parts 12 to 15 form a non-return valve, which only allows flow from the lower to the upper side of the cylinder.

The disc 7 contains passages 16 which are provided with a spring-loaded non-return valve 17 on the top side, which valve only allows flow from the lower to the upper side of the disc.

Below the disc 7 is an amplifier piston 19 which is displaceable up and down in a cylinder 18, and on which the resilient valve body 20 of the damper valve is fitted. This valve body 20 contacts a seat at the bottom side of the disc 7 when the damper valve is in the closed position.

The amplifier piston 19 contains a narrow duct 21 (for restriction) which connects the space above and below the piston 19. The pressure above and below the piston 19 can be balanced by means of this duct.

A solid, relatively heavy piston 23 (mass inertia piston) which is displaceable up and down in a cylinder 22 is disposed below the amplifier piston 19. This heavy piston is retained between two springs 24, 25. The spring 25 presses a valve body 26 against a seat formed on the cover of the cylinder 22. An aperture 27 is provided in this cylinder cover. The spring 24 rests against the bottom plate 8. The mass inertia piston 23 has a passage 28 with non-return valve 29.

The oil tank 3 is connected by means of apertures 30 to the space below the disc 7.

The shock absorber works as follows:

On the outgoing stroke (the piston 4 moves upwards) the oil above the piston 4 is pressed through the apertures 11 into the hollow piston rod 5 and comes to rest in the central pipe 10. Near the foot of this pipe 10 the oil flows through the damper valve to the ducts 16 and via the non-return valve 17 into the space below the piston 4. On the ingoing stroke (piston 4 moves downwards) the oil lying below the piston 4 will flow through the non-return valve 13, 14, 15 to the increasing space above the piston 4. An oil volume corresponding to the volume of the piston rod 5 penetrating the working cylinder 1 also flows through the central pipe 10 to the damper valve 7, 20 and after passing through it goes into the tank 3 through the apertures 30. The non-return valve 13, 14, 15 of the piston 4 causes negligible damping; the damping action is produced by the damper valve 7, 20 on the bottom side of the disc 7. The size of the damping is determined by the system 18, 19, 22 to 29 situated below the valve body 20, in particular by the combination of mass inertia piston 23 and the springs 24, 25, the so-called mass spring system. This system is designed for the actual frequency of the non sprung mass (wheel, hub, disc brake, wheel guide part). When the wheel is flung up, the piston 23 remains behind, while oil flows via the ball valve 29 and the passage 28 from the space below the piston 23 to the space above the piston 23. The valve body 26 comes away from its seat, so that the pressure below the amplifier piston 19 is reduced or falls off. The valve body 20 of the damper valve is pressed on its seat with little or no pressure, so that the damping action is very slight. This is restored after the piston 23 is returned to its original place by the springs 24, 25, and the valve body 26 goes onto its seat. The oil flow through the narrow duct 21 can then pressurize the space below the amplifier element 19.

The mass inertia piston 23 displaces oil when it moves, so that the recoil movement is damped. With a suitable selection of the characteristics of the springs 24, 25 and the mass of the piston 23, the damping of the shock absorber can decrease to zero at high frequencies of the movement of the unsprung mass. The movements of low frequency and great amplitude can be damped in the optimum manner.

In the embodiment according to FIG. 2, corresponding parts are given the same reference numbers. This embodiment differs from that of FIG. 1 in that the mass spring system is replaced by an electromagnetic system. Moreover, the amplifier element 19 is also a damper valve body. The said electromagnetic system comprises a permanent magnet 31, which is fixed to the cylinder 18, and a suspended electrical coil 32 with horizontal choke plate 33.

The attracting action of the permanent magnet on the electrically excited coil causes the choke plate 33 to be pressed against a seat surrounding an outflow port 34 in the bottom of the cylinder 18.

A spring 35 which presses the piston 19 against a seat at the bottom side of the disc 7 is active between the bottom of the cylinder 18 and the amplifier piston 19.

The coil 32 is electrically connected to earth at one side, and at the other is connected by means of a wire 37 to a connecting element 36 which can be connected to an electronic control system. The exciting of the coil 32 will result in a reduction or enlargement of the gap between the choke plate 33 and the duct 34. When the gap increases a release in pressure occurs below the amplifier piston 19, with the result that the piston is not pressed as hard against the damper valve seat, so that there is less damping. A reduction in the width of the gap results in greater damping.

The said electronic control system is connected to sensors which pass on information to the system on any change in the steering angle per second, the speed of travel, the horizontal and vertical, lateral and transversal speed, the height of travel etc. This system excites the coil 32, so that a lower or higher damping level is selected. The switching speed is extremely high. The damper valve reacts to slight movements in the regulating coil. As in FIG. 1, the damping can be switched off fully or partially if there are disturbing high frequencies in the movement of the unsprung part of the wheel guide.

A disadvantage of the invention according to FIG. 2 can be that leakage between the amplifier piston 19 and the cylinder 18 is not constant. Seals cannot be used, due to the additional friction.

The embodiment according to FIGS. 3 and 4 does not have these disadvantages. In this embodiment also, corresponding parts are given the same reference numbers. The amplifier element 19 is free from the walls of the cylinder 8, 18 and is suspended in resilient plates 40. The valve body 17 of the damper valve also consists of resilient plates. There is no risk of leaking; oil can pass through the exciting element only via duct 21. The regulating process can be accurate; the sensitivity is great. Provision is made below the throttle plate 33 for another leaf spring 41 which holds the throttle plate in the de-energized position.

In the embodiment according to FIGS. 2, 3 and 4 the space below the bottom of the cylinder 18 is connected to the tank 3.

It is of essential importance for the invention that the damping takes place on both the outgoing and the ingoing stroke by means of the same damper valve, whose damping action is regulated mechanically or electromagnetically in such a way that at high frequency of the movement of the unsprung part of the wheel guide it is reduced to a minimum, while at low frequency the normal damping action is achieved. The embodiments described lead to very rapid adaptation of the damping action to the said frequency. The piston 4 in the working cylinder 1 is simple in design and has only one non-return valve which lies round the central pipe in such a way that it gives a dynamic seal. Concentrating the damping in a single regulating element is a great practical advantage. Of course, various additions and modifications are possible within the scope of the invention. For example, the duct 34 can contain a cylindrical shaft with flat side or a tapering shaft which rests on the choke plate 33 and determines the dimensions of the passage accurately when the choke plate is not resting on its seat.

I claim:

1. A shock absorber comprising:

a work cylinder and an oil reservoir;

a piston slidably received in said working cylinder and defining a first working chamber on one side of said piston and a second working chamber on the other side of said piston;

a piston rod extending from said piston into said first working chamber adjacent one side of said working cylinder;

an upstream valve placed in said piston;

a hydraulic passageway connecting said first and second working chambers;

a metering orifice placed in said hydraulic passageway, said metering orifice in hydraulic communication with said piston, both said piston and said metering orifice capable of movement independently of one another, wherein said metering orifice has a constant area opening within said hydraulic passageway; and means coupled to said metering orifice for regulating the damping effect of said metering orifice on a fluid contained in said working cylinder.

2. A shock absorber according to claim 1, wherein an opening of said metering orifice is in constant and unobstructed communication within said hydraulic passageway.

3. A shock absorber according to claim 1, wherein the operation of the metering valve is electrically controlled.

4. A shock absorber comprising:

a working cylinder and a piston operatively disposed in said working cylinder, said cylinder adapted to capture a working fluid and said piston adapted to reciprocate within said cylinder and act against said fluid, wherein said piston includes only one valve disposed therein;

a fluid reservoir hydraulically coupled to said working cylinder, said hydraulic coupling including a circuit;

a metering orifice with a fixed area opening disposed in said circuit, both said piston and said metering orifice capable of movement independently of one another, said metering orifice used for metering the flow of hydraulic fluid through said circuit; and means coupled to said metering orifice for regulating the damping effect executed by said metering orifice on said working fluid.

5. A shock absorber according to claim 4, wherein an opening of said metering orifice is in constant and unobstructed communication with said circuit.

6. The shock absorber of claim 4, wherein said fluid reservoir generally surrounds an outside portion of said cylinder.

7. The shock absorber of claim 4, wherein said metering orifice is generally surrounded by said fluid reservoir.

* * * * *